UNITED STATES PATENT OFFICE.

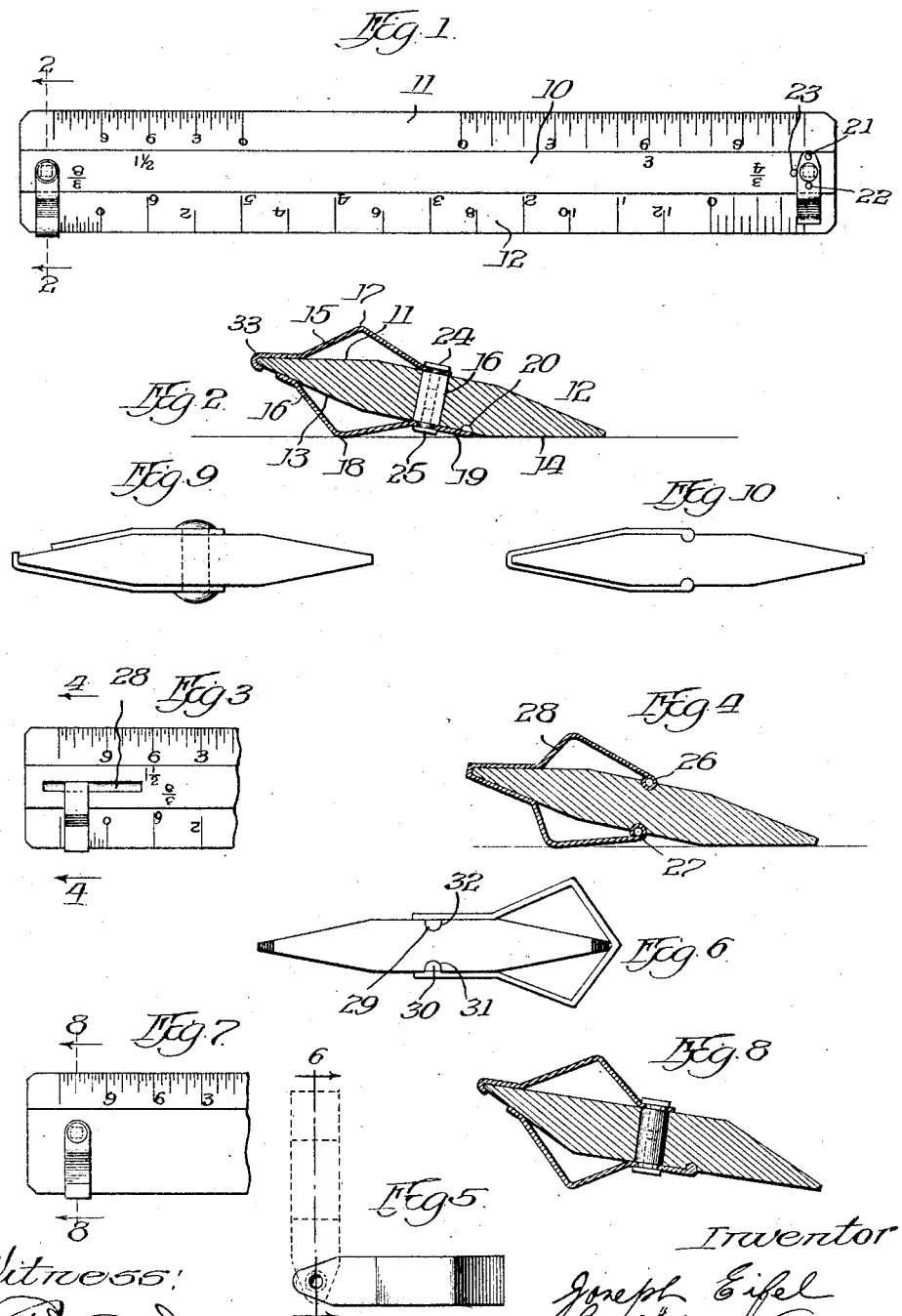

JOSEPH EIFEL, OF CHICAGO, ILLINOIS.

INDICATOR FOR SCALES.

1,249,049.  Specification of Letters Patent.  Patented Dec. 4, 1917.

Application filed December 16, 1916. Serial No. 137,356.

*To all whom it may concern:*

Be it known that I, JOSEPH EIFEL, a citizen of the United States, and a resident of Chicago, in the State of Illinois and county of Cook, have invented certain new and useful Improvements in Indicators for Scales, of which the following is a specification.

This invention relates to an indicator for scales, more particularly such scales as have thereon a plurality of different scales on various edges thereof of the kind employed by engineers, architects, etc. Experience has shown that much time is lost in locating the particular scale in use on the work in hand when the scale is laid aside from time to time. Accordingly I have provided means for indicating which scale is being used at any given time.

The principal objects of my present invention are the provision of means for indicating which of a plurality of scales is to be used; the provision of means for supporting one edge of a bevel-edged scale at a height sufficient to bring the other edge into a desirable working position; and the provision of means for transferring the indicator from one edge of the scale to the opposite edge.

In attaining the foregoing objects, together with certain additional benefits and advantages to be below disclosed, I have provided a construction various embodiments of which are illustrated in the accompanying drawing wherein—

Figure 1 is a plan view of a scale having an indicator thereon constructed in accordance with my present invention;

Fig. 2 is a section on the line 2—2 of Fig. 1;

Fig. 3 illustrates a further form of construction;

Fig. 4 is a section on the line 4—4 of Fig. 3;

Fig. 5 is a plan view of another form of construction;

Fig. 6 is a section on the line 6—6 of Fig. 5;

Fig. 7 is a plan view of a still further form of construction;

Fig. 8 is a section on the line 8—8 of Fig. 7;

Fig. 9 is a section of a modified form of the device shown in Figs. 1 and 2; and Fig. 10 is a section of a modified form of the device shown in Figs. 3 and 4.

Referring to the form of construction illustrated in Figs. 1 and 2, it will be seen that I have illustrated a scale 10 having beveled surfaces 11 and 12 with different scales graduated thereupon. The scale 10 has also beveled surfaces 13 and 14 opposite to the beveled surfaces 11 and 12. These beveled surfaces 13 and 14 may also be provided with graduations similar to those arranged on the beveled surfaces 11 and 12.

My indicator comprises two strips 15 and 16 of metal, celluloid or other suitable material arranged on each side of the scale and connected thereto by means of a pivot device 16. These strips 15 and 16 may be bent outwardly intermediate their ends so as to provide elbows 17 and 18. These elbows are preferably arranged to project to such a distance that when the scale is laid on a flat surface the outer part of the elbow will lie either in or below the plane of the bevel 12 or 14, respectively (see Fig. 2.) This is desirable since a scale formed as shown would otherwise rest upon its central portion so that its edges would be at a distance above the supporting surface. This, of course, is undesirable for the reason that the edge of the scale should be in close contact with the paper of the drawing on which it is being used. As the pivot 16 is arranged near the end of the scale and in the center line of the scale, the parts 15 and 16 may be turned around from one side of the scale, to the other in order to bring the opposite edge of the scale into operation.

In order to keep the indicator fixed in the desired position one of these strips, for instance the strip 16 may be provided with an extension 19 having thereon a hemispherical knob 20 adapted to register with holes 21 or 22 according as to the side to which the indicator is turned. An intermediate hole 23 may also be used in case it is desired to turn the indicator to the end, in which case any one of the scales of the indicator may be used equally well, although it is not usually desirable to use the scale with the indicator in this position.

One of the strips, for instance strip 15 may be provided with a curved extension 33 adapted to engage the edge of the scale and prevent the indicator being moved laterally nearer the center of the scale than shown in Fig. 1.

The pivot 16 consists of a tubular member with two screws 24 and 25 inserted from either side through apertures in the strips 15 and 16. Preferably these screws are arranged to connect the strips to the tubular member in such a way that the indicator will move as a whole when one strip is moved by the fingers. For this purpose the screws 24 and 25 have squared portions adapted to engage with the edges of correspondingly shaped apertures in the strips 15 and 16.

In the form of construction shown in Figs. 3 and 4 the pivot 16 is dispensed with and engagement between the indicator 28 and the scales is obtained by means of the cylindrical end portions 26 and 27 of the indicator 28. These cylindrical portions 26 and 27 slip into and engage grooves 28 arranged along the axis of the scale. The indicator 28 is made of sufficiently resilient material to enable the parts 26 and 27 to grip the scale therebetween and at the same time allow removal of the indicator when it is desired to move the indicator from one edge of the scale to the opposite edge.

In the form of construction shown in Figs. 5 and 6, the ends of the indicator are formed with hemispherical projections 29 and 30 which engage corresponding recesses 31 and 32 in the scale.

In the form shown in Figs. 7 and 8 an indicator is shown applied to a scale having only two beveled surfaces instead of four as in the case on the scales shown in Figs. 1 to 6, inclusive. The construction in this case is similar to that of Figs. 1 and 2 so far as the manner of connection of the indicator to the scale is concerned.

Although there are only two beveled edges and consequently there is not the same need for supporting one edge of the scale above the paper as exists in the form shown in Figs. 1 to 6 there is the same need of bringing the scale into a desirable working position by raising the edge opposite the one in contact with the paper of the drawings and this is accomplished by the device described.

The forms of construction shown in Figs. 9 and 10 differ from those of Figs. 1 and 2 on the one hand and Figs. 3 and 4 on the other hand by the fact that the outwardly projecting elbows have been omitted and the clip lies close to the scale throughout its length.

In the form shown in Fig. 9 each half of the indicator can be turned about the pivot independently of the latter since there are no squared portions on the shank of the pivot as in the form shown in Figs. 1 to 3 which would prevent such relative rotation.

Having thus described my invention and illustrated its use, what I claim as new and desire to secure by Letters Patent is:

1. A device of the character described comprising in combination a scale having an edge beveled on both sides and having scales on both beveled surfaces and a clip pivotally mounted on said scale for supporting the other edge of said scale at an angle not substantially less than the angle of bevel.

2. A device of the character described comprising in combination a scale having a beveled edge and a clip pivotally mounted on said scale for supporting the other edge of said scale at an angle not substantially less than the angle of the bevel.

3. A device of the character described comprising in combination a scale having two edges having scales thereon and a clip pivotally mounted on said scale adapted to engage one or other of said edges and thereby act as an indicator of the scale to be used.

4. A device of the character described comprising in combination a scale having not more than two edges having scales thereon and means adapted to point to one or other of said edges and thereby act as an indicator of the scale to be used and yielding means for holding said means in one or other position.

5. A device of the character described comprising in combination a scale having two edges beveled on both sides and having scales on all four beveled surfaces, and a clip pivotally mounted on said member adapted to point to one or the other of said scales and thereby act as an indicator of the scale to be used.

In testimony whereof I have hereunto signed my name in the presence of the two subscribing witnesses.

JOSEPH EIFEL.

Witnesses:
 RIDSDALE ELLIS,
 WILLIAM GOLDBERGER.

Copies of this patent may be obtained for five cents each, by addressing the "Commissioner of Patents, Washington, D. C."